July 8, 1941. K. P. LORENZ 2,248,539
PRODUCTION OF CELLULOSE FORMATES
Filed Sept. 8, 1939
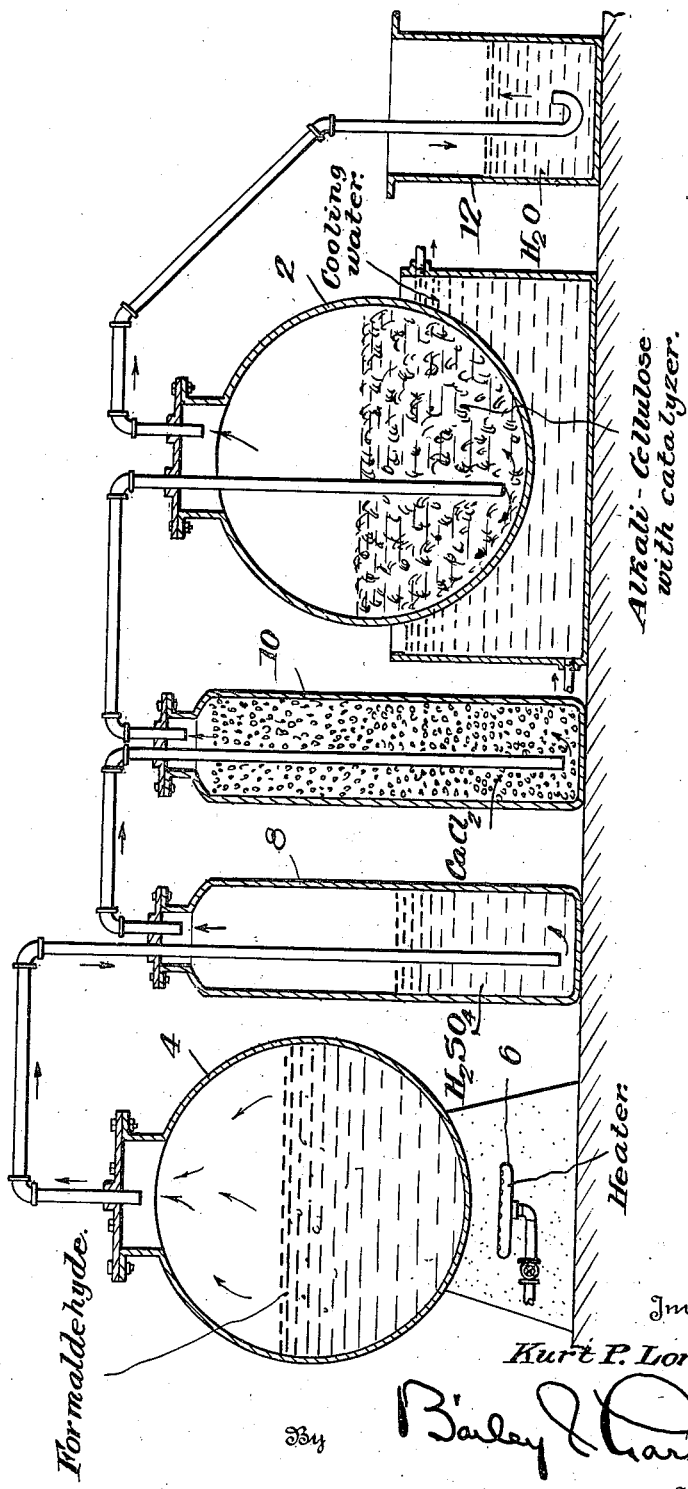
Inventor
Kurt P. Lorenz,
By Bailey & Carson
Attorneys Patented July 8, 1941

2,248,539

UNITED STATES PATENT OFFICE 2,248,539

PRODUCTION OF CELLULOSE FORMATES

Kurt P. Lorenz, St. Albans, N. Y.

Application September 8, 1939, Serial No. 294,011

2 Claims. (Cl. 260—228)

The invention relates to the production of cellulose formates, and particularly to the production of such formates by treatment of cellulose with formaldehyde.

It has been known that cellulose formate can be prepared by treatment of cellulose with highly concentrated or anhydrous formic acid. Catalysts such as sulfuric acid, lead chloride or zinc chloride have been added in order to speed up the reaction. The cellulose formate is then precipitated out of the solution by the addition of large amounts of water and suitable treatment.

This process has numerous disadvantages. In the first place, the reaction requires a long period of time, very often from one to two days. Furthermore, even when such a long period is allowed, the process must be carried out at elevated temperatures in order to hasten the reaction. This results in a high cost of manufacture, because of the expense of the highly concentrated formic acid, and because of the long period of the reaction. Furthermore, the products produced are not as satisfactory in quality as other cellulose esters since the cellulose formate is sensitive to water and chemically unstable. Finally, the long period of the reaction and the high temperature employed tend to degrade the cellulose and impair the strength of the resulting product.

The primary object of the present invention is to provide a procedure for making cellulose formates which is inexpensive and short and which, at the same time, preserves the strength of the finished product.

One of the features of the invention resides in the use of formaldehyde as the reactant instead of anhydrous formic acid, such reactant being much less expensive than the concentrated formic acid heretofore required.

A further feature of the invention resides in the fact that the process can be carried out in a much shorter period of time and at low temperatures, even at or below room temperature, so that, while the economy of the process is increased, the damage to the cellulose is decreased. Thus a more satisfactory product results. The invention consists generally in treating cellulose with formaldehyde in the presence of a concentrated solution of a strong alkali, utilizing preferably cuprous oxide or copper hydroxide as a catalyst.

Further objects and advantages will be seen from the following description when taken in conjunction with the accompanying drawing, which forms a part thereof.

The drawing shows an apparatus suitable for carrying out the second mode of operation set out below.

The following is an example of the manufacture of a cellulose formate according to my invention:

*Example*

A concentrated solution containing about 9 grams of copper in the form of copper sulfate is added to 400 cc. of an aqueous solution of caustic soda containing 23% of NaOH. Copper hydroxide precipitates out of the solution, and is thus available to act as a catalyst. To this solution is now added 400 cc. of formaldehyde and then 100 grams of cotton. The mixture is left to stand until the reaction is completed, which occurs within about two hours. Then 9 kg. of water are added to the solution and the cellulose formate precipitates out in the form of a fine powder. This powder is pressed in a filter and washed with running water to remove free formic acid. Slight amounts of formic acid and alcohol produced in the reaction are recovered from the wash water by distillation. The washed cellulose formate is placed in a centrifuge to remove most of the water, and then placed in a drying oven until it is completely dry.

The dried cellulose formate is then dissolved in some formic acid. Tricresyl phosphate is added as a plasticizer, and the formate is formed into a sheet of transparent material.

The cellulose formates so produced are of high quality. They are chemically stable and are not sensitive to water. The articles formed therefrom have high strength comparable to that of other cellulose esters.

The above example, it is understood, is only typical, and the process is susceptible of many variations. For instance, the process may also be carried out in an apparatus such as that shown in the drawing (which represents a small apparatus, although for commercial purposes larger and other equivalent devices might be used) in which the procedure is as follows:

Copper hydroxide is precipitated out from an aqueous solution of NaOH in the same manner as in the above example in reaction chamber 2. Cotton or some other cellulosic material is then added to the alkali solution, and agitated therewith until it is fully alkalized.

Vessel 4 contains formaldehyde. It is heated by heater 6 to drive off formaldehyde vapors. These vapors pass through drying chambers 8 and 10 containing sulfuric acid and calcium chloride respectively. Then the vapors pass into the alkalized cellulose in chamber 2 and formylate the same. The excess vapors pass into a water trap 12 which recovers the excess formaldehyde.

The temperature of the reaction in chamber 2 may be controlled if desired by a water bath 14.

Instead of caustic soda, any other strong alkali such as caustic potash can be used. Any highly concentrated solution, preferably one containing between 20% and 23% of caustic soda, or other strong alkali in a proportion to give the same alkalinity, may be used. The quantities of the different materials used are variable, although preferably the formaldehyde is present in an amount at least equal to the amount of the caustic soda solution, and in greater than equimolecular proportion to the alkali. The cellulose, such as cotton, does not exceed 20% of the total of formaldehyde and alkali solution. Preferably the amount of alkali is somewhat in excess of that required to alkalize the cellulose, or in more than equimolecular proportion thereto.

The process is preferably discontinued when the cellulose is fully formylated, that is, when all of it has been converted into cellulose monoformate. Continuation of the treatment may result in the production of di- or tri-formates, which for some purposes are less valuable.

The process may be accelerated by the action of heat, but too high heating sometimes damages the cellulose and the process is preferably carried out without heating.

The removal of the formic acid from the water may be carried out in different manners, as, for example, by distillation, or by conversion of the formic acid into a soluble or insoluble compound such as a sodium salt of formic acid.

The final cellulose formate may be treated in many different manners before use. Instead of adding plasticizers, or along with them, fillers may be used for the production of molded articles. Furthermore, sheets or films, threads, lacquers, varnishes, enamels or electrical insulating materials, either transparent, translucent or opaque may be made from the resulting product.

Finally, the process is equally applicable to the production of di-formates and tri-formates, the only difference being that the amount of formaldehyde is substantially two or three times greater, or that higher pressures and longer reaction times are used.

The term "formaldehyde" as used in the examples refers to an aqueous solution containing about 40% of formaldehyde.

While I have described herein some embodiments of my invention I wish it to be understood that I do not intend to limit myself thereby except within the scope of the appended claims.

I claim:

1. A process of producing a cellulose formate comprising treating cellulose with a concentrated solution which is liquid at normal temperatures containing a caustic alkali in excess of equimolecular proportion with the cellulose and formaldehyde in excess of equimolecular proportion with the alkali in the presence of a catalyst selected from the group consisting of copper hydroxide and cuprous oxide.

2. A process of producing a cellulose formate comprising treating cellulose with an aqueous solution containing from 20% to 23% of caustic soda in excess of equimolecular proportion with the cellulose and formaldehyde in excess of equimolecular proportion with the alkali in the presence of a catalyst selected from the group consisting of copper hydroxide and cuprous oxide.

KURT P. LORENZ.